(12) United States Patent
Noack et al.

(10) Patent No.: US 11,517,974 B2
(45) Date of Patent: Dec. 6, 2022

(54) DEVICE AND METHOD FOR MANUFACTURING A COMPOUND COMPONENT AND MOTOR VEHICLE

(71) Applicants: Volkswagen AG, Wolfsburg (DE); ARNOLD UMFORMTECHNIK GMBH & CO. KG, Dorzbach (DE)

(72) Inventors: Thomas Noack, Wolfsburg (DE); Friedrich Beck, Ohringen (DE); Uwe Wolfarth, Schrozberg (DE); Lars Wiese, Hannover (DE); Christoffer Meyer, Braunschweig (DE)

(73) Assignees: Volkswagen AG, Wolfsburg (DE); ARNOLD UMFORMTECHNIK GMBH & CO. KG, Dorzbach (DE)

( * ) Notice: Subject to any disclaimer, the term of this patent is extended or adjusted under 35 U.S.C. 154(b) by 346 days.

(21) Appl. No.: 16/000,027

(22) Filed: Jun. 5, 2018

(65) Prior Publication Data
US 2018/0345403 A1 Dec. 6, 2018

(30) Foreign Application Priority Data
Jun. 6, 2017 (DE) .................. 10 2017 112 448.9

(51) Int. Cl.
*B23K 11/31* (2006.01)
*B23K 11/11* (2006.01)
(Continued)

(52) U.S. Cl.
CPC ........ *B23K 11/315* (2013.01); *B23K 11/0066* (2013.01); *B23K 11/11* (2013.01);
(Continued)

(58) Field of Classification Search
CPC ... B23K 11/315; B23K 11/3009; B23K 11/11; B23K 11/0066; B23K 11/0053; B23K 2101/006; B23K 2103/20; B21J 15/32
(Continued)

(56) References Cited

U.S. PATENT DOCUMENTS

| 4,544,821 A | * | 10/1985 | Humblot | B23K 11/317 219/116 |
| 5,146,062 A | * | 9/1992 | Koda | B23K 9/206 219/93 |

(Continued)

FOREIGN PATENT DOCUMENTS

| CN | 104332580 | 2/2015 |
| CN | 104816081 | 8/2015 |

(Continued)

*Primary Examiner* — Eric S Stapleton
(74) *Attorney, Agent, or Firm* — Muncy, Geissler, Olds & Lowe, P.C.

(57) ABSTRACT

Device (10) for manufacturing a component compound by resistance welding, comprises a welding electrode (12) for transmitting an electric current to a joining element (17) and for exerting a joining force onto the joining element (17) along a joining direction (22) in order to establish a connection of the joining element (17) with a structural element by resistance welding; as well as a positioning device (20) for positioning at least one joining element (17) on the axis of the joining direction (22) in order to contact and particularly apply a force to the joining element (17) by means of the welding electrode (12). The positioning device (20) comprises a retention device (30) for exerting a retention force onto the joining element (17), wherein the retention device (30) is movably arranged.

7 Claims, 7 Drawing Sheets

(51) Int. Cl.
*B23K 11/30* (2006.01)
*B23K 11/00* (2006.01)
*B21J 15/32* (2006.01)
*B23K 101/00* (2006.01)
*B23K 103/20* (2006.01)

(52) U.S. Cl.
CPC ........... *B23K 11/3009* (2013.01); *B21J 15/32* (2013.01); *B23K 2101/006* (2018.08); *B23K 2103/20* (2018.08)

(58) Field of Classification Search
USPC ....................................................... 219/86.9
See application file for complete search history.

(56) References Cited

U.S. PATENT DOCUMENTS

| | | | | | |
|---|---|---|---|---|---|
| 5,269,713 | A * | 12/1993 | Brezovar | ........... | B23K 11/0066 174/84 C |
| 5,359,171 | A * | 10/1994 | Aoyama | ................ | B23K 9/206 219/93 |
| 5,412,172 | A * | 5/1995 | Ichikawa | .............. | B23K 11/115 219/86.41 |
| 5,529,491 | A * | 6/1996 | Hilgenfeldt | .............. | A61C 7/18 433/23 |
| 5,789,719 | A * | 8/1998 | Pary | ..................... | B23K 11/317 219/86.25 |
| 5,895,584 | A * | 4/1999 | Sakota | ................ | B23K 11/315 219/86.24 |
| 6,193,142 | B1 * | 2/2001 | Segawa | ................ | B23K 37/047 219/148 |
| 6,294,750 | B1 * | 9/2001 | Al-Nabulsi | .......... | B23K 3/0338 219/85.19 |
| 6,610,958 | B2 * | 8/2003 | Stricklen | .............. | B23K 9/1336 219/75 |
| 6,653,590 | B1 * | 11/2003 | Aoyama | ................ | B23K 11/14 219/86.25 |
| 6,706,991 | B2 * | 3/2004 | Aoyama | ................ | B23K 9/206 219/93 |
| 9,914,181 | B1 * | 3/2018 | Granger | ............... | B23K 11/14 |
| 2001/0015346 | A1 * | 8/2001 | Kanjo | ................ | B23K 11/315 219/109 |
| 2001/0019038 | A1 * | 9/2001 | Sato | ...................... | B23K 11/311 219/86.33 |
| 2002/0014474 | A1 * | 2/2002 | Tiberghien | ............ | B23K 11/311 219/86.32 |
| 2002/0096945 | A1 * | 7/2002 | Dugas | ................. | B23K 11/315 310/50 |
| 2002/0125219 | A1 * | 9/2002 | Janssens | ................ | B23K 11/31 219/86.41 |
| 2003/0094441 | A1 * | 5/2003 | Dugas | ................. | B23K 11/315 219/90 |
| 2003/0189029 | A1 * | 10/2003 | Kilabarda | .......... | B23K 11/3018 219/86.25 |
| 2004/0173578 | A1 * | 9/2004 | Leach | ................. | B23K 11/255 219/110 |
| 2004/0208031 | A1 * | 10/2004 | Miwa | ................... | B23K 11/315 363/141 |
| 2005/0082340 | A1 * | 4/2005 | Wiedemann | .......... | B23K 11/311 228/103 |
| 2006/0124606 | A1 * | 6/2006 | Tenzer | .................... | F15B 15/22 219/89 |
| 2007/0047082 | A1 * | 3/2007 | Seaver | ................. | B23K 9/0026 359/512 |
| 2007/0199556 | A1 * | 8/2007 | Murai | ................... | B23K 11/315 126/20 |
| 2008/0237198 | A1 * | 10/2008 | Edwards | ................ | B23K 11/11 219/86.33 |
| 2009/0249606 | A1 * | 10/2009 | Diez | ................. | B23K 37/0461 29/428 |
| 2010/0025383 | A1 * | 2/2010 | Tiberghien | ........... | B23K 11/315 219/119 |
| 2010/0170879 | A1 * | 7/2010 | Kanaya | ................ | B23K 11/093 219/104 |
| 2011/0147355 | A1 * | 6/2011 | Miwa | ................... | B23K 11/315 219/136 |
| 2011/0192829 | A1 * | 8/2011 | Matsumoto | .......... | B23K 11/315 219/136 |
| 2012/0055904 | A1 * | 3/2012 | Sakai | ................ | B23K 11/3009 219/119 |
| 2015/0001186 | A1 * | 1/2015 | Ryu | ....................... | B23K 11/14 219/86.24 |
| 2015/0069026 | A1 * | 3/2015 | Cielinski | ................ | H02P 29/60 219/91.1 |

FOREIGN PATENT DOCUMENTS

| | | |
|---|---|---|
| CN | 204893183 | 12/2015 |
| CN | 105414819 | 3/2016 |
| DE | 69006088 | 6/1994 |
| DE | 102015207517 | 11/2016 |
| DE | 102015207518 | 11/2016 |
| DE | 102016101755 | 8/2017 |
| JP | H10225774 | 8/1998 |
| KR | 200450397 | 9/2010 |

* cited by examiner

DEVICE AND METHOD FOR MANUFACTURING A COMPOUND COMPONENT AND MOTOR VEHICLE

CROSS REFERENCE TO RELATED APPLICATIONS

Benefit is claimed to German Patent Application No. 102017112448.9, filed Jun. 6, 2017, the contents of which are incorporated by reference herein in their entirety.

FIELD

The invention relates to a device for manufacturing a component compound by resistance welding, a method for manufacturing a component compound and a motor vehicle, particularly a passenger car.

BACKGROUND

Resistance welding allows joining several parts by means of a joining element, such as a rivet. Therein, the joining element, which consists of an electrically conductible material, is heated by resistance heating, and is thereby welded with a structural element which is also electrically conductible upon forming a welding spot.

Therein typically used joining elements are rivet-like rotationally symmetrical bodies with a shaft portion and a head portion adjoining the shaft portion in an axial direction, wherein the head portion comprises a greater diameter than the shaft portion. For implementing the welding process, the joining element is put or driven with the shaft portion through a first structural element to be joined along a joining direction, until the head portion is positioned at the surface of the first part.

Therein, the first structural element may comprise an opening, into which the joining element is put. Alternatively, upon realizing an electric current and exerting a force, the joining element may be driven into the first structural element, which has been made flowable by resistance heating.

Therein, the joining element is configured such that at the described position it contacts a second structural element to be joined with an area of the shaft portion which is oriented right at the front along the joining direction, wherein the second structural element is electrically conductible just as the joining element, and with which it forms the described welding spot. In this manner, the first component is clamped between the head portion of the joining element and the second component and is thereby fixed. The first structural element may be manufactured from any material, which does not necessarily have to be electrically conductible. For example, joining an aluminium sheet metal to a steel sheet metal is possible in this manner, which is frequently applied for weight reduction.

Such a method is described in DE 10 2015 207 517 A1. Therein, the joining element is introduced into the first structural element upon a compressive force and resistance heating of the first structural element by means of an electric current, such that the shaft portion penetrates the first structural element and contacts the second part. By means of an electric welding current through the joining element and the second structural element, the shaft portion and the second structural element are welded by resistance welding. Furthermore, a joining device for implementing the described method is disclosed. It comprises two opposing electrodes, which are movable relative to each other, and a means for providing electrically conductible joining elements.

For automation and industrial application of the described method for resistance welding, it is desirable to be able to feed the joining elements automatically. DE 10 2015 207 518 A1 discloses a joining device with a setting head, at which an elongated joint stamp and a feeding device with a guidance channel positioned perpendicular to the longitudinal extension of the joint stamp is positioned for feeding a rivet-like joining element. The joining device further comprises a counter holder positioned opposite of the joint stamp. Therein, the joint stamp and the counter holder are formed as electrical electrodes which are configured to implement a resistance welding process.

By means of the feeding device, the joining elements can be fed to a pick-up position, so that a longitudinal axis of the joining element is oriented parallel to the longitudinal axis of the joint stamp. Therein, the joining element may be secured from tilting. The feeding device may comprise an end stop to define the pick-up position and a position securing device for preventing a movement of the joining elements against the feeding direction. Furthermore, it may comprise two clamping jaws for clamping the joining elements particularly during overhead operation.

Further known devices facilitate feeding of joining elements and loose orientation of the joining elements by gravity for executing the resistance welding process on a guidance device. However, these are frequently prone to malfunction and not able to realize a variable automated process (where applicable).

SUMMARY

The objective of the invention is to provide a device and a method allowing simple and cost-effective manufacture of compound structures of parts by resistance welding.

This objective is attained by the device for manufacturing a component compound by resistance welding according to claim 1 and the method for manufacturing a component compound according to claim 8. Embodiments of the device are specified in dependent claims 2-7, an embodiment of the method is specified in claim 9. Furthermore, a motor vehicle, particularly a passenger car, according to claim 10 is provided.

BRIEF DESCRIPTION OF THE DRAWINGS

In the following, the invention is illustrated by means of the examples depicted in the attached drawings.

These show

DETAILED DESCRIPTION

A first aspect of the invention is a device for manufacturing a component compound by resistance welding, particularly by resistance element welding. It comprises a welding electrode for transmitting an electric current to a joining element and for exerting a joining force onto the joining element along a joining direction in order to establish a connection of the joining element with a structural element by resistance welding. Furthermore, the device comprises a positioning device for positioning at least one joining element on the axis of the joining direction in order to contact and particularly apply a force to the joining element by means of the welding electrode. Therein, the positioning device comprises a retention device for exerting a retention force, which is particularly oriented perpendicular to the joining direction, onto the joining element. The retention device is movably arranged in order to realize a movement of the joining element, such that it is movable perpendicular to the joining direction with at least one component of its direction of movement.

The device according to the invention is configured for conducting the described resistance element welding process. To this end, in order to be impinged with the necessary electric potential, the structural element is to be connected with a counter electrode, which may be positioned opposing the described electrode on the other side of the part. In this case, the counter electrode may likewise be formed as a counter-pressure element, such that the application of force to the joining element may be realized between the two electrodes or by means of the two electrodes. Alternatively, the counter electrode may be placed at any position and electrically conductively connected with the structural element, and a separate counter-pressure element may be positioned opposite of the described electrode. Therein, the electrode and/or the counter-pressure element is movably arranged along the joining direction, such that the joining force can be applied. In particular, the electrode is configured for applying a contact pressure onto the joining element along the joining direction. In particular, the section of the structural element to be welded stretches in a plane extending perpendicular to the joining direction. Therein the axis of the joining direction is the imaginary line, along which a relative movement between the welding electrode and the structural element is performed.

The electrode comprises a contact section for contacting the joining element. The contact section is typically positioned at an electrode cap comprised in the electrode, wherein contacting the joining element is realized with the electrode cap. The contacting serves to establish an electrically conductible connection in order to realize a resistance heating. Applying the force may be realized to put or drive the joining element through the part.

As described, an electrically conductible, essentially rotationally symmetric element with a shaft portion and a head portion adjoining the shaft portion in an axial direction, wherein the head portion comprises a greater diameter than the shaft portion, is typically used as a joining element. In particular, the device according to the invention is used for manufacturing a component compound comprising at least two parts by means of the joining element, wherein at least one of the parts is electrically conductible as described.

The positioning device, particularly the retention device, is configured to position the joining element on the axis of the joining direction at a target position required for welding. Therein, in particular, the longitudinal axis of the joining element is positioned on the axis of the joining direction, which extends through the longitudinal extension of the welding electrode. The device, in particular the welding electrode, is typically configured to apply a contact pressure acting along the joining direction onto the joining element before or at the beginning of the welding process, thereby fixing it at the target position. Thus, the joining element is clamped between the welding electrode and the structural element to be joined. Now, exerting the retention force by the retention device may be terminated, and the retention device may be moved out of the axis of the joining direction, before an electric current is realized for obtaining resistance heating.

In particular, positioning the joining element on the axis of the joining direction serves to position the joining element at the welding electrode, such that an electrically conductible contact is established. For establishing the contact, a movement of the welding electrode may be necessary. Therein, the positioning device is at least configured to realize a component of movement oriented perpendicular to the joining direction.

In an embodiment, the positioning device is merely configured to position the joining element on the axis of the joining direction, and in order to establish the contact with the welding electrode, it must be moved along the joining direction.

Furthermore, for implementing the welding process an electrically conductible contact between the joining element and the structural element is necessary. Typically establishing this contact takes place by means of the relative movement between the said components and particularly by means of moving the welding electrode with the joining element to the part.

Exerting the retention force by means of the retention device means an active application of force, which particularly may be continuous. In particular the retention force is essentially perpendicular to the joining direction and may be realized for example by gripping the joining element from the side.

In order to position the joining element on the axis of the joining direction, the retention device is particularly movable perpendicular to the joining direction. In this manner the retention device may transport the joining element positioned therein from a position outside of the axis of the joining direction onto this axis. Therein, the retention device with the joining element is movable relative to the electrode. For example, the retention device may be formed as a gripper impinged or impingable with a spring force.

The described device for manufacturing a component compound provides a simple and cost-effective possibility to position joining elements used for resistance element welding at the target position necessary for the welding process in an automatable manner at high precision. The positioning is process reliable and fault-resistant, since inclinations of tongs, lateral misalignment of the electrode axes and disruptive influences of glue between the parts to be joined can be compensated.

Furthermore, no specially formed welding electrodes are necessary, because available or known welding electrodes can be equipped according to the invention by arranging the described positioning device. Hence, cost-efficient and widespread equipment may be continuously used.

By exerting the retention force, realizing the resistance welding process is possible in every direction in space and independently of the direction of gravity, for example for vertically or diagonally oriented parts.

In an embodiment of the device for manufacturing a compound structure of parts, the positioning device comprises at least one first linear guidance device for linear translation of the retention device onto the axis of the joining direction or away from it and/or at least one rotation device for rotating the retention device into the axis of the joining direction or out of it.

Thus, the movable arrangement of the retention device for realizing transport of the joining element into the target position is realized by a linear guidance device and/or a rotation device. In particular, the linear guidance device may be arranged such that its axis of translation extends perpendicular to the joining direction. In particular, the rotation device may be arranged such that its axis of rotation is parallel to the joining direction. This leads to the advantage that the transport of the joining element onto the axis of the joining direction can be realized respectively with moving by short distances.

In a further embodiment of the device, the positioning device comprises at least one second linear guidance device for realizing a relative movement between the retention device and the welding electrode along the axis of the joining direction.

Therein, the second linear guidance device may serve to move the retention device into a position, which is distant from the structural element to be welded. For example, this may be realized in order to arrange the joining element at the retention device at a position, which is distant from the structural element to be joined. In this manner, the device is able to realize a resistance welding process at parts of different geometries.

The second linear guidance device may also serve to establish a contact between the electrode and the joining element. The joining element may be positioned on the axis of the joining direction by means of the first linear guidance device, and subsequently brought into an electrically conductible contact with the electrode by moving the second linear guidance device.

Therein, the second linear guidance device is typically configured to move the retention device, and, in case of the presence of a first linear guidance device, is movably arranged at it, for example according to serial kinematics. Alternatively, it may be configured to move the welding electrode relative to the retention device. In this case, it is possible that also the application of the joining force onto the joining element along the joining direction by means of the welding electrode is realized by the second linear guidance device.

For example, the joining element may be moved along the axis of the joining direction relative to the welding electrode by the described linear guidance device. This embodiment advantageously leads to an especially flexible usability of the device according to the invention, since arbitrary structural element geometries may be joined.

In an embodiment, the welding electrode is movable together with the positioning device along the joining direction, for example by means of a third linear guidance device. In this manner, the retention device with the joining element may be moved toward the structural element together with the welding electrode along the joining direction, and thus an electrically conductible contact between the joining element and the structural element to be joined may be established.

Thereby, the third linear guidance device serves to position the welding electrode in respect of the structural element or at the structural element and particularly to exert the joining force onto the joining element along the joining direction. If present, the second linear guidance device may in this case serve to move the retention device into a position which is distant from the structural element to be welded or to position the retention element at the welding electrode as described.

In a further embodiment, the retention device comprises at least two gripping arms for gripping the joining element. At least one gripping arm is movably arranged in order to realize a relative movement of the gripping arms. In particular, the device comprises a first drive equipment for moving the movable gripping arm.

Here, the retention device is formed as a gripper. Therein, the first drive equipment for moving the movable gripping arm and thereby for realizing the retention force, may be a spring or a pneumatic, hydraulic and/or electrical drive. Of course, the first drive equipment may also be configured to move both gripping arms, in case both of them are movable.

Gripping is typically realized by clamping the joining element, wherein retention forces act on the joining element in a radial direction, particularly perpendicular to the joining direction. Therein, for example, the gripping arms may comprise rounded sections, which are configured for arranging the head portion and/or the shaft portion of the joining element.

In particular, the retention device is configured to grip the joining element at its shaft portion. To this end, the gripping arms may be narrower than the longitudinal extension of the shaft portion, such that after clamping the joining element between the electrode and a structural element to be joined, the gripper may realize an opening of the gripping arms and a sideways movement away from the axis of the joining direction upon applying the contact pressure.

This has the advantage that precise retention forces can be exerted by the defined movements of the gripping arms, and that holding of the joining element is automatable and can take place especially safely and reproducibly. Furthermore, alternatively to the design as gripper, the retention device may be formed as a vacuum cup or magnetic holder.

In an embodiment, the device comprises a feeding device for feeding at least one joining element to the positioning device, particularly in a defined orientation.

In particular, the feeding device serves to feed the joining element to the retention device. Thereby, a joining element may be introduced into the process from the outside. For example, for pressure or vacuum driven transport, the feeding device may comprise a hose, such as a profile hose, to which it is connected in order to transport the joining elements to the feeding device. In this manner, the joining elements may be fed to the feeding device and subsequently to the retention device, in a defined orientation, such that they can be retained by the retention device at a defined position. Alternatively, a guiding system, on which the joining elements are movable in a guided manner, is possible.

Therein, the feeding device may be configured such that the joining elements are provided one after the other at a defined transfer position. The retention device may be moved to the transfer position in order to receive the respective joining element. In case the retention device is formed as a gripper, the opened gripping arms of the retention device may for example serve as an end stop, at which the movement of the joining elements is stopped. By moving at least one gripping arm, the retention force may subsequently be applied. Other devices may also be used for decelerating the joining elements, such as for example an electromagnetic braking system. Alternatively, it is possible to design an end section of the feeding device with a locking step, particularly in case of a guiding system, at which the joining elements are positioned, and from which they can be gripped.

This has the advantage that the joining element can be provided in an automated manner. In particular, the feeding device is configured to feed a plurality of joining elements, thus, several joining processes may be carried out after one another in a speedy manner.

For separating the joining elements, for example a separator may be arranged. Also a magazined provision, for example with an interim storage upstream of the feeding device, is possible.

In an embodiment of the invention, the retention device may be firmly attached to the feeding device. In this case, the feeding device, which may be connected to a hose for transport of the joining elements also in this embodiment, is movable at least with one component of its direction of movement perpendicular to the joining direction. In particular, this movement may be realized by the first linear guidance device as described.

In a further embodiment the positioning device comprises a transfer device for delivering the joining element to the retention device, wherein particularly the transfer device is movable relative to the retention device.

The transfer device may be configured to remove the joining elements from the feeding device and hand over the joining elements to the retention device.

The arrangement of a transfer device has the advantage that cycle times can be optimized. During positioning of the joining element at the welding electrode by means of the retention device, a further joining element which is subsequently to be used may already be removed from the feeding device, which allows a faster and more efficient process.

The transfer device may comprise at least two gripping arms for gripping the joining element, wherein at least one gripping arm is movably arranged in order to realize a relative movement of the gripping arms. In particular, the device comprises a second drive equipment for moving the movable gripping arm.

Therein, for example, the transfer device may be formed analogously to the retention device and comprise the features described therein. It may also be connected to at least one linear guidance device for linear translation in respect of the feeding device.

Therein, the opened gripping arms of the transfer device may serve as an end stop at which the movement of the joining element is stopped as described.

This embodiment has the advantage that the entire transport chain from provision to transfer and positioning of the joining element may be carried out especially variably, safely and efficiently.

A second aspect of the invention is a method for manufacturing a compound structure of parts. It comprises providing a device for manufacturing a component compound according to the invention and providing an electrically conductible structural element and an electrically conductible joining element. Holding of the joining element takes place by means of the retention device, and positioning the joining element on the axis of the joining direction takes place by means of the positioning device, such that the joining element contacts the welding electrode or is able to contact the welding electrode during a relative movement between the joining element and the welding electrode. The method further comprises establishing an electrically conductible contact between the joining element and the welding electrode, particularly by realizing a relative movement between the joining element and the welding electrode. Realizing a relative movement between the joining element and the structural element takes place in order to establish an electrically conductible contact between the joining element and the part. Furthermore, the method comprises realizing an electric current through the joining element and the structural element by means of the welding electrode to obtain resistance heating in order to establish a weld between the joining element and the part.

In particular, the method comprises providing a second structural element from an arbitrary material and its positioning between the joining element and the described first structural element in order to manufacture a component compound from the two parts. In this case, the joining element is put through the second structural element as described and welded with the first structural element, wherein the second structural element is held between the generated welding spot and the head portion of the joining element by a positive and/or frictional connection. Typically, a counter electrode opposing the welding electrode is utilized to realize the electric current and particularly to exert the joining force onto the joining element.

Establishing the electrically conductible contact between the joining element and the welding electrode may be comprised in the step of positioning the joining element by means of the positioning device, for example in case of a movement perpendicular to the joining direction by the retention device with the joining element.

In an embodiment of the method, the device for manufacturing a component compound comprises a feeding device for feeding at least one joining element to the positioning device in a defined orientation, and the positioning device comprises a transfer device for delivering the joining element to the retention device, wherein the transfer device is movably arranged relative to the retention device. It comprises two gripping arms for gripping of the joining element, wherein at least one gripping arm is movably arranged in order to realize a relative movement of the gripping arms. In this embodiment of the method, a joining element is fed to the positioning device, namely to the delivery device, in a defined orientation by means of the feeding device. Therein, it is decelerated such that the opened gripping arms of the transfer device serve as an end stop. At least one gripping arm is moved to grip the joining element and deliver it to the retention device, particularly after a movement of the delivery device.

In a further embodiment of the method, a common movement of the welding electrode and the retention device with the joining element takes place along the joining direction after positioning the joining element on the axis of the joining direction, wherein particularly the positioning comprises a movement of the retention device with the joining element by means of the second linear guidance device along the axis of the joining direction.

Therein, particularly, the movement of the retention device with the joining element along the axis of the joining direction is a movement opposite the joining direction. Alternatively, establishing the electrically conductible contact may be realized by a movement of the welding electrode along the joining direction.

In an embodiment, the joining element is first positioned together with the retention device on the axis of the joining direction by means of the first linear guidance device. Subsequently, a relative movement between the joining element and the welding electrode takes place to establish the electrically conductible contact. This is realized by a movement of the retention device of the second linear guidance device against the joining direction. By this embodiment, the positioning or contacting can be realized independently of the length of the electrode cap. This has the advantage that the length or design of electrode caps that have to be ground or milled down in regular do not influence the positioning of the joining elements, since the relative movement can compensate for the different heights.

In particular, the common movement of the welding electrode and the retention device with the joining element arranged thereon, which particularly contacts the welding electrode, is realized by means of the third linear guidance device. It serves to position the joining element at or in a structural element to be joined. Therein, typically, no relative movement between the retention device and the welding electrode is realized any more.

This embodiment has the advantage that by the defined positioning of the joining element at the electrode, the danger of a defective joint, for example by tilting of the joining element from the axis of the joining direction, may be prevented efficiently. Therefore, damage to the retention device may be prevented also in case of a faulty positioning of the structural element, the device and/or the positioning device.

Alternatively, it is also possible to position the joining element at the structural element to be joined by means of the positioning device, and subsequently realize a relative movement between the welding electrode and the joining element positioned at the part. The method according to the invention is not restricted to the described order of establishing an electrically conductible contact and realizing a relative movement between the joining element and the structural element, but at least in these steps, the method may also be implemented in reverse order.

A further aspect of the invention is a motor vehicle, particularly a passenger car. It comprises at least one component compound manufactured by means of the method according the invention. In particular, the component compound is a compound structure of two parts, for example a compound structure of a steel sheet metal, such as from a high strength or super high strength steel, with an aluminum sheet metal.

Figure 1:
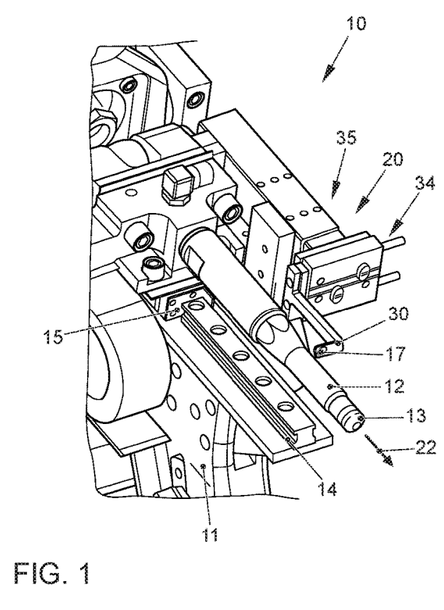
FIG. 1: a perspective view of a device for manufacturing a component compound according to the invention in a first position.

FIG. 1 shows an embodiment of the device 10 for manufacturing a component compound by resistance welding according to the invention. It comprises a welding electrode 12 with an electrode cap 13 arranged thereon. The welding electrode 12 is configured to transfer an electric current to a joining element 17.

The joining element 17 is held by a retention device 30 arranged next to the electrode. The retention device 30 is a structural element of the positioning device 20, which serves to position the joining element 17 on the axis of the joining direction 22. This positioning with the aim of establishing an electrically conductible contact and particularly further applying a force onto the joining element 17 by means of the welding electrode 12 takes place in particular to prepare the resistance welding process.

The device 10 comprises a third linear guidance 14, on which a slide 15 is movably arranged, in order to move the positioning device 20 and the welding electrode 12 along the joining direction 22 in this manner. Thereby, the joining force can be applied onto the joining element, and hence on a structural element to be welded (not depicted here) by means of the welding electrode 12. For implementing the resistance welding process, the device further comprises a second welding electrode or counter electrode opposing the welding electrode 12, which is also not depicted here, and which is mechanically connected to the welding electrode 12 via the pliers body 11 of the welding tongs formed as C-tongs. In the present example, it is arranged mechanically fixed at the pliers body 11.

The positioning device 20 comprises a first linear guidance device 34, by means of which the retention device 30 may be relocated onto the axis of the joining direction 22. This relocation takes place perpendicular to the axis of the joining direction 22. The first linear guidance device 34 is in turn arranged on the movable side of a second linear guidance device 35, the axis of movement of which extends parallel to the axis of the joining direction 22. The side of the second linear guidance device 35 which is fixed in respect of the movable side of the second linear guidance device 35 is mechanically connected to the welding electrode 12, and, as described, movable together with it on the third linear guidance 14 by means of the slide 15.

At the position depicted here both linear guidance devices 34, 35 are shown in the retracted state, such that the retention device 30 is not positioned on the axis of the joining direction 22, and is in a retracted position in respect of the electrode cap 13.

Alternatively to the variant shown here, the retention device may also comprise a rotation device, by means of which it or the joining element held by it is movable into the axis of the joining direction. A movement device, which is able to carry out both translational and rotational movements along a common axis, may also be used.

Figure 2:
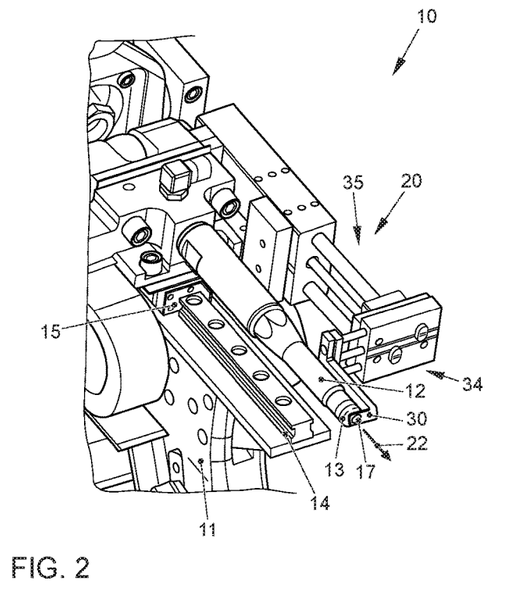
FIG. 2: a perspective view of the device of FIG. 1 in a second position.

FIG. 2 shows the same device after performing two relative movements of the retention device 30 in respect of the welding electrode 12. It is evident that both linear guidance devices 34, 35 are now depicted in the extended state. The joining element 17 is now positioned in the axis of the joining direction 22, and a contact of the electrode cap 13 with the joining element 17 is already established.

In particular, to reach the shown position, the second linear guidance device 35 has been moved beyond the shown position, and subsequently the retention device 30 with the joining element 17 has been moved into the axis of the joining direction 22 by means of the first linear guidance device 34. Thereupon, a movement of the retention device 30 took place by means of the second linear guidance device 34 against the joining direction 22, such that an electrically conductible contact between the joining element 17 and the welding electrode 12 was established.

Figure 3:
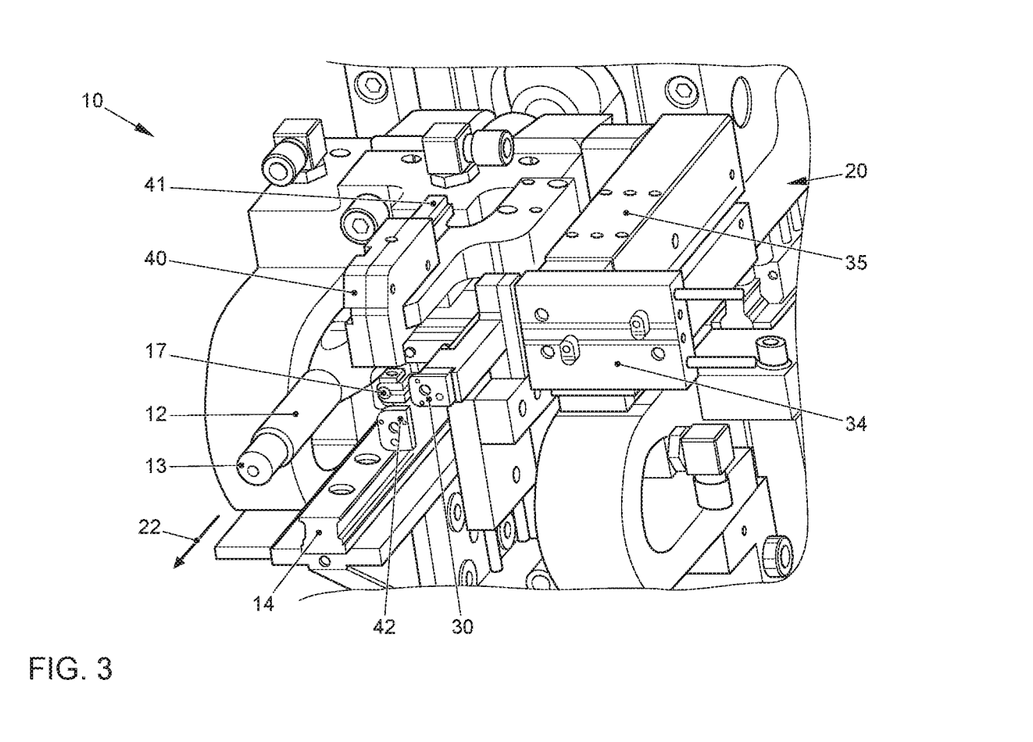
FIG. 3: a perspective view of a further embodiment of a device for manufacturing a component compound according to the invention.

FIG. 3 shows a further embodiment of the device 10 according to the invention. In addition to the elements already described in FIGS. 1 and 2, it comprises a feeding device 40 for feeding of joining elements. A contour hose 41 is connected to it, by means of which the joining elements can be transported to the feeding device 40 in a defined orientation by an overpressure. Thus, the feeding device 40 serves as a coupling between the contour hose 41 and the transfer device 42 for transport of individual joining elements 17. It provides a curved guidance for the joining elements 17, in which they undergo a direction reversal of 90°.

Furthermore, the positioning device 20 comprises a transfer device 42 for delivery of the joining element to the retention device 30. It is fixedly arranged at the positioning device 20 and therefore comprises a fixed position in respect of the feeding device 40. The transfer device 42 is configured to grip joining elements 17 fed by the feeding device 40 and pass them on to the retention device 30.

Also in the embodiment shown here, the retention device 30 is movable in respect of the welding electrode 12 by means of the serially arranged linear guidance devices 34, 35. In the retention device 30, a joining element 17 is arranged. Therein, the retention device 30 is in a transfer position, in which it grips the joining element 17 from the transfer device 42 to position it on the axis of the joining direction 22. In this position of the retention device 30, both linear guidance devices 44, 45 are in the retracted state.

Figure 4:
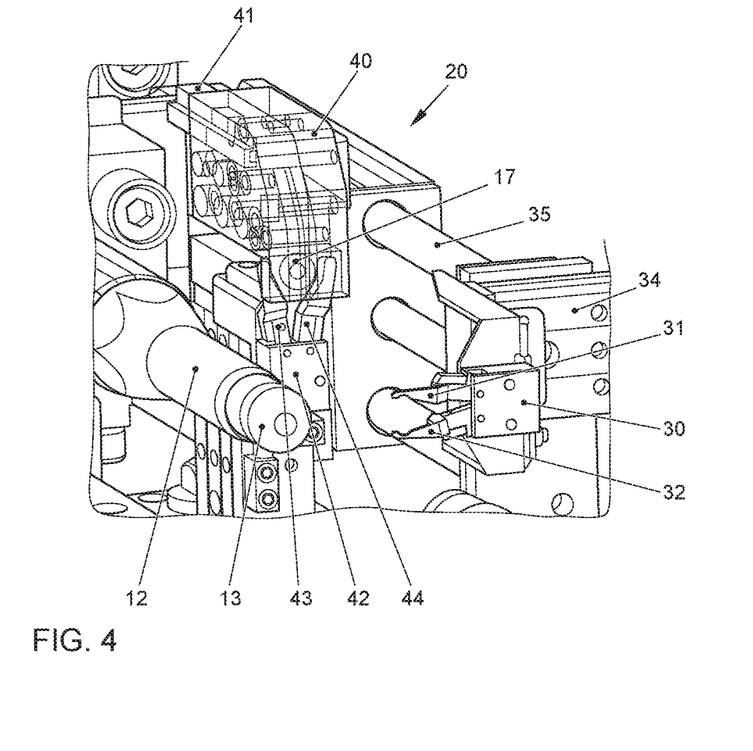
FIG. 4: a perspective detail view of the device from FIG. 3, FIG. 5: a perspective detail view of a further embodiment of a device according to the invention while performing steps of the method.

Both the retention device 30 and the transfer device 42 each comprise two gripping arms. This is depicted in detail in FIG. 4. The transfer device 42 comprises two movable gripping arms 43, 44, which are shown in the opened position. In the feeding device 40 arranged above it, a joining element 17 is positioned at the end of the described guidance, which is prevented from moving further by the opened gripping arms 43, 44 and in turn decelerated. By means a movement of the gripping arms 43, 44 towards each other, the head portion of the joining element 17 is positioned at the rounded receiving recesses positioned at the insides of the gripping arms 43, 44, and is clamped by sideways or radially acting forces. Therein, the shaft portion projects towards the retention device 30, such that it is able to hold it by exerting the holding force.

Figure 5:
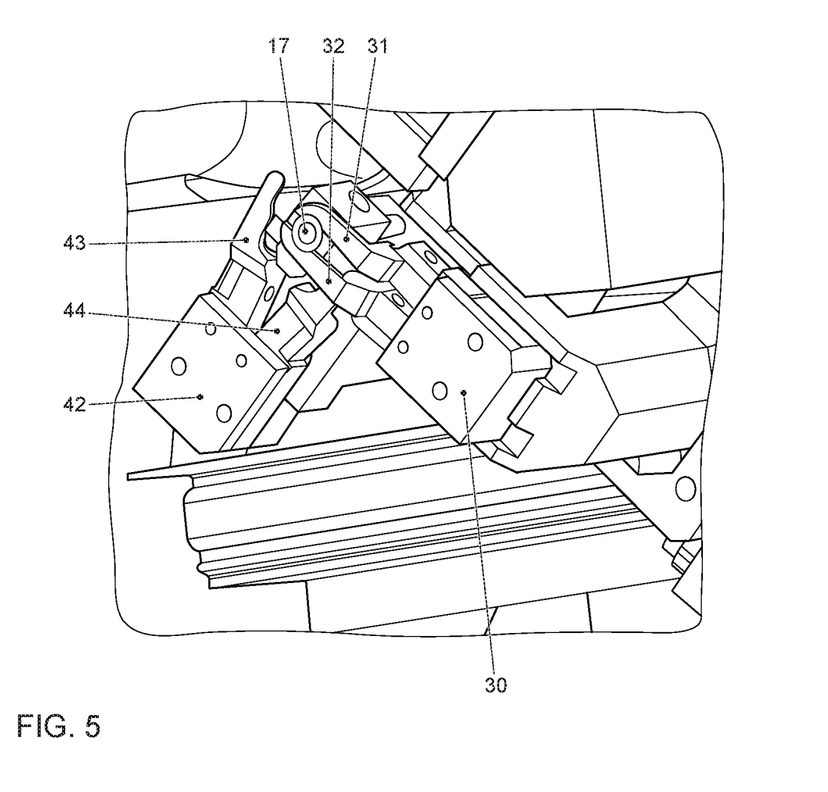

FIG. 5 shows an alternative embodiment, in which the retention device 30, the feeding device and the transfer device 42 are turned by 45° in respect of the welding electrode. Compared to the previously shown embodiments, this embodiment offers significant space savings, and thus allows a very compact design of the device according to the invention, which is able to realize joints at all areas of a three-dimensionally formed structural element, for example a vehicle body.

In this diagram, delivery of the joining element 17 from the transfer device 42 to the retention device 30 is depicted in detail. Here, the transfer device 42 may be movably arranged along the joining direction just as the retention device 30, and coupled to a linear guidance device to this end. Therefore, it may be moved along the joining direction away from the feeding device to deliver the joining element, which is clamped between the two gripping arms 43, 44 with its head portion, to the retention device 30. It is evident that the shaft portion of the joining element is held by the gripping arms 31, 32 of the retention device 30 upon exerting the retention force, which is oriented perpendicular to the joining direction. Therein, the gripping arms 31, 32 of the retention device 30 comprise a smaller width along the joining direction than the length of the shaft portion of the joining element 17.

Figure 6:
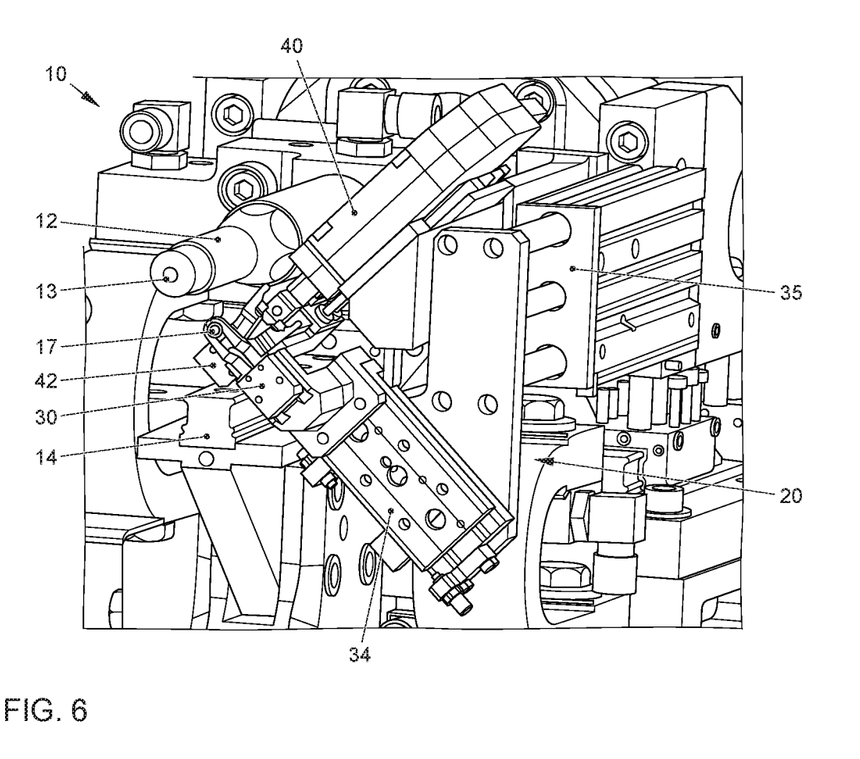
FIG. 6: a perspective view of the device from FIG. 5 while performing further steps of the method.

FIG. 6 shows the described embodiment during a subsequent step of the method. The joining element 17 is now moved by moving the retention device 30 by means of the second linear guidance device 35 along the joining direction. The transfer device 42 is depicted with opened gripping arms. In case of a movable design, it could be moved back to the feeding device 40 to serve as an end stop for the next joining element, which is transported into the opened gripping arms by overpressure.

Furthermore, it is evident that in order to realize the 45° angle, a respectively designed plate is arranged at the movable side of the second linear guidance device 35. On it, in turn, the first linear guidance device 34 is arranged in the stated angle of 45°. The transfer device 42 and the feeding device 40 are fixed at a plate of the positioning device 20, which is arranged at a respective angle at the device 10 for manufacturing a compound structure of parts.

In this embodiment, the retention device 30 and the transfer device 42 each comprise a sensor for detecting a joining element. By means of the sensor, it may be detected at each point in time of the method, whether a joining element is arranged in the respective device and the method may be controlled accordingly. For example, in case a faulty gripping of a joining element occurs in one of the stated elements, feeding may be repeatedly performed, to provide a joining element for the welding process and position it correctly by means of the retention device 30.

Figure 7:
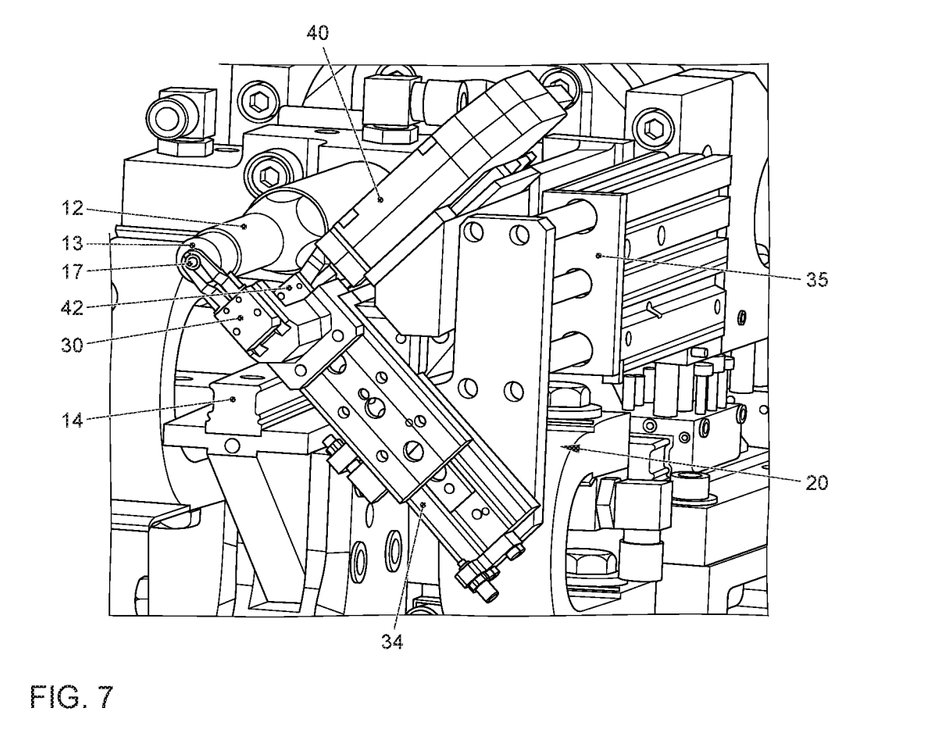
FIG. 7: a perspective view of the device from FIGS. 5-6 while performing further steps of the method.

FIG. 7 shows the following steps of the method by means of the device 10 according to the invention. Compared to FIG. 6, the retention device 30 is now also shifted perpendicular to the axis of the joining direction, which is realized by the first linear guidance device 34. Therefore, the joining element 17 is positioned at the necessary target position for implementing the weld at the tip of the welding electrode 12, namely at its electrode cap 13. The transfer device 42 is arranged at the transfer position again to receive the following joining element 17 from the feeding device 40. In the following step, the welding electrode 12 may now be moved together with the positioning device 20 by means of the third linear guidance 14 along the joining direction to clamp the joining element 17 at the structural element to be joined. From this position, the retention device 30 may release the joining element 17 and be moved from the axis of the joining direction by means of the first linear guidance device 34.

Figure 8:
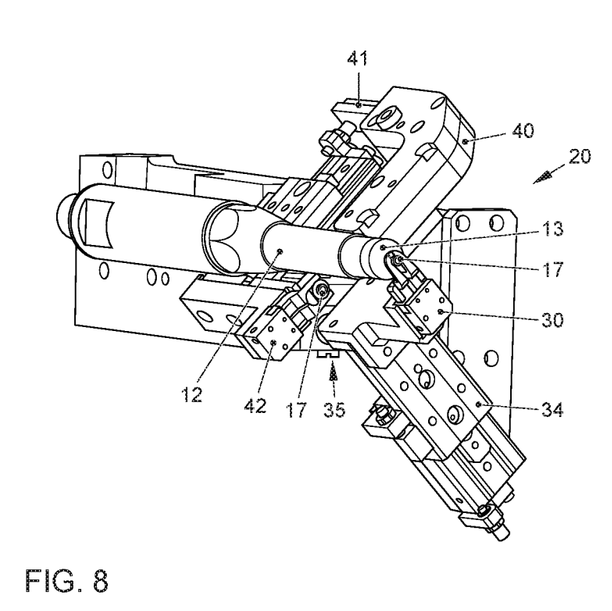
FIG. 8: a further perspective view of the device from FIGS. 5-7.

The subsequent step is depicted in FIG. 8, which shows the device according to the invention from a further perspective. It is evident that a further joining element 17 is arranged in the transfer device 42 next to the joining element 17 held by the retention device 30. After performing the welding process by means of the welding electrode 12, the retention device may be moved back to the transfer position at the transfer device 42 to position the subsequent joining element 17.

LIST OF REFERENCE NUMERALS

Device 10
Pliers body 11
Welding electrode 12
Electrode cap 13
Third linear guidance 14
Slide 15
Joining element 17
Positioning device 20
Joining direction 22
Retention device 30
First gripping arm of the retention device 31
Second gripping arm of the retention device 32
First linear guidance device 34
Second linear guidance device 35
Feeding device 40
Contour hose 41
Transfer device 42
First gripping arm of the delivery device 43
Second gripping arm of the delivery device 44

We claim:
1. A device for manufacturing a compound component by resistance element welding, comprising
a welding electrode for transmitting an electric current to a joining element that is to be connected with a structural element, and the welding electrode provided for exerting a joining force onto the joining element along an axis of a joining direction in order to establish a connection of the joining element with the structural element by resistance welding, and a positioning device for positioning the joining element on the axis of the joining direction so that the welding electrode is able to contact and exert the joining force onto the joining element, wherein the positioning device comprises a retention device for exerting a retention force, oriented perpendicular to the joining direction, onto the joining element, wherein the retention device is movably arranged on the device in order to realize a movement of the joining element, such that the retention device is movable, with respect to the welding electrode, in a direction that is perpendicular to the joining direction, wherein the retention device is provided with at least two gripping arms for gripping the joining element, wherein at least a first one of the at least two gripping arms is movable in a direction towards and away from at least a second one of the at least two gripping arms to grip the joining element therebetween, and wherein the device comprises a first drive equipment for moving the at least first one of the at least two gripping arms, such that the retention device is able to grip the joining element by the at least two gripping arms while also moving, with respect to the welding element, in the direction that is perpendicular to the joining direction.

2. The device for manufacturing a compound component according to claim 1, wherein the device comprises a feeding device for feeding the joining element to the retention device of the positioning device in a defined orientation.

3. The device for manufacturing a compound component according to claim 2, wherein the positioning device comprises a transfer device for delivering the joining element from the feeding device to the at least two gripping arms of the retention device, wherein the transfer device is movable relative to the retention device.

4. The device for manufacturing a compound component according to claim 3, wherein the transfer device comprises at least two gripping arms for gripping the joining element, wherein at least a first one of the at least two gripping arms is movable in a direction towards and away from at least a second one of the at least two gripping arms to grip the joining element therebetween, and wherein the device comprises a second drive equipment for moving the at least first one of the at least two gripping arms of the transfer device.

5. The device for manufacturing a compound component according to claim 1, wherein the retention device of the positioning device is movable, with respect to the welding electrode, perpendicular to the joining direction, such that the retention device is movable onto the axis of the joining direction or away from the axis of the joining direction.

6. The device for manufacturing a compound component according to claim 5, wherein the retention device of the positioning device is also movable, with respect to the welding electrode, in the joining direction, such that a relative movement between the retention device and the welding electrode is realized along the axis of the joining direction.

7. The device for manufacturing a compound component according to claim 1, wherein the retention device is movable in the direction that is perpendicular to the joining direction while the welding electrode remains stationary.

\* \* \* \* \*